(12) United States Patent
Rowe et al.

(10) Patent No.: US 9,650,248 B2
(45) Date of Patent: *May 16, 2017

(54) MULTI-ELEMENT ANIONIC REAGENT COMPLEXES

(71) Applicants: Toyota Motor Engineering & Manufacturing North America, Inc., Erlanger, KY (US); The University of Manitoba, Winnipeg (CA)

(72) Inventors: Michael Paul Rowe, Pinckney, MI (US); Elizabeth Marie Skoropata, Winnipeg (CA); Johan Alexander van Lierop, Winnipeg (CA)

(73) Assignees: Toyota Motor Engineering & Manufacturing North America, Inc., Erlanger, KY (US); The University of Manitoba, Winnipeg (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/176,313

(22) Filed: Jun. 8, 2016

(65) Prior Publication Data

US 2016/0280542 A1    Sep. 29, 2016

Related U.S. Application Data

(63) Continuation-in-part of application No. 14/506,373, filed on Oct. 3, 2014, now Pat. No. 9,384,878, which (Continued)

(51) Int. Cl.
*C01B 6/04* (2006.01)
*H01F 3/00* (2006.01)
(Continued)

(52) U.S. Cl.
CPC ............. *C01B 6/23* (2013.01); *C01B 6/21* (2013.01); *C01B 19/04* (2013.01); *H01F 1/0311* (2013.01); *H01F 3/00* (2013.01)

(58) Field of Classification Search
CPC .... C01B 6/21; C01B 6/06; C01B 6/02; H01F 3/00; H01F 1/0311
See application file for complete search history.

(56) References Cited

U.S. PATENT DOCUMENTS 7,041,350 B1 * 5/2006 Rule ..................... C08G 63/88
    428/221
7,785,392 B2   8/2010 Shim et al.
(Continued)

FOREIGN PATENT DOCUMENTS

JP   WO 2012007830 A1 * 1/2012 ........... C01B 3/0042
JP       2012038697 A     2/2012
(Continued)

OTHER PUBLICATIONS

Chen et al., "Improved Dehydrogenation Properties of Ca(BH4)2•nNH3 (n=1, 2, and 4) Combined with Mg(BH4)2", J. Phys. Chem., Sep. 2012, pp. 21162-21168, vol. 116.

(Continued)

*Primary Examiner* — Stanley Silverman
*Assistant Examiner* — Syed Iqbal
(74) *Attorney, Agent, or Firm* — Christopher G. Darrow; Darrow Mustafa PC

(57) ABSTRACT

Reagent complexes have two or more elements, formally in oxidation state zero, complexed with a hydride molecule. Complexation with the hydride molecule may be evidenced by shifts to lower binding energies, of one or more electrons in each of the two or more elements, as observed by x-ray photoelectron spectroscopy. The reagents can be useful for the synthesis of multi-element nanoparticles. Preparation of the reagents can be achieved by ball-milling a mixture that includes powders of two or more elements and a hydride molecule.

17 Claims, 7 Drawing Sheets

Related U.S. Application Data is a continuation-in-part of application No. 14/269,909, filed on May 5, 2014, now Pat. No. 9,260,312, and a continuation-in-part of application No. 14/269,895, filed on May 5, 2014, now Pat. No. 9,260,305, and a continuation-in-part of application No. 14/046,081, filed on Oct. 4, 2013, now Pat. No. 8,980,219.

(60) Provisional application No. 62/319,659, filed on Apr. 7, 2016.

(51) Int. Cl.
    *C01B 6/23* (2006.01)
    *C01B 19/04* (2006.01)
    *C01B 6/21* (2006.01)
    *H01F 1/03* (2006.01)

(56) References Cited

U.S. PATENT DOCUMENTS

| | | | |
|---|---|---|---|
| 8,192,866 B2 | 6/2012 | Golightly et al. | |
| 8,372,177 B1 | 2/2013 | Thoma et al. | |
| 8,395,003 B2 | 3/2013 | Leger et al. | |
| 8,980,219 B1 | 3/2015 | Rowe et al. | |
| 9,142,834 B2 | 9/2015 | Mohtadi et al. | |
| 9,216,910 B2 * | 12/2015 | Rowe | C01B 6/246 |
| 2005/0217427 A1 | 10/2005 | Suthersan et al. | |
| 2009/0029148 A1 | 1/2009 | Hashimoto et al. | |
| 2009/0090214 A1 | 4/2009 | Cheng | |
| 2009/0264277 A1 | 10/2009 | Raj et al. | |
| 2013/0084502 A1 | 4/2013 | Singh et al. | |
| 2015/0068646 A1 | 3/2015 | Rowe | |
| 2015/0096887 A1 | 4/2015 | McDonald et al. | |
| 2015/0097649 A1 | 4/2015 | Rowe | |
| 2015/0098882 A1 | 4/2015 | Rowe | |
| 2015/0098884 A1 | 4/2015 | Rowe | |
| 2015/0098885 A1 | 4/2015 | Rowe | |
| 2015/0098886 A1 | 4/2015 | Rowe et al. | |
| 2015/0098892 A1 | 4/2015 | Rowe et al. | |
| 2015/0099118 A1 | 4/2015 | Mizuno et al. | |
| 2015/0099135 A1 | 4/2015 | Mohtadi et al. | |
| 2015/0099172 A1 | 4/2015 | Rowe et al. | |
| 2015/0099182 A1 | 4/2015 | Singh et al. | |
| 2015/0099183 A1 | 4/2015 | Singh et al. | |
| 2016/0199916 A1 | 7/2016 | Rowe et al. | |
| 2016/0200753 A1 | 7/2016 | Rowe et al. | |

FOREIGN PATENT DOCUMENTS

| | | |
|---|---|---|
| JP | 2013073839 A | 4/2013 |
| JP | 2013131366 A | 7/2013 |
| WO | 2013056185 A1 | 4/2013 |
| WO | 2013063161 A2 | 5/2013 |

OTHER PUBLICATIONS

Imamura et al., "Dehydriding of Sn/MgH2 nanocomposite formed by ball milling of MgH2 with Sn", Int. J. Hydrogen Energy, Jul. 2007, pp. 4191-4194, vol. 32.

Schüth et al., "Light Metal Hydrides and Complex Hydrides for Hydrogen Storage", Chem Commun, Sep. 2004, pp. 2249-2258, Issue 20.

Varin et al., "The Effects of Ball Milling and Nonmetric Nickel Additive on the Hydrogen Desorption from Lithium Borohydride and Manganese Chloride (3LiBH4+MnCl2) Mixture", 2010, Int. J. Hydrogen Energy, pp. 3588-3597, vol. 35.

Wronski et al., "A New Nanonickel Catalyst for Hydrogen Storage in Solid-state Magnesium Hydrides", 2011, Int. J. Hydrogen Energy, pp. 1159-1166, vol. 36.

\* cited by examiner

MULTI-ELEMENT ANIONIC REAGENT COMPLEXES

CROSS-REFERENCE TO RELATED APPLICATIONS

This application claims the benefit of U.S. Provisional Application No. 62/319,659, filed Apr. 7, 2016. This application is also a continuation-in-part of currently pending U.S. patent application Ser. No. 14/506,373, filed Oct. 3, 2014, which is a continuation-in-part of each of: U.S. patent application Ser. No. 14/269,909, filed May 5, 2014, now U.S. Pat. No. 9,260,312; and U.S. patent application Ser. No. 14/269,895, filed May 5, 2014, now U.S. Pat. No. 9,260,305; and U.S. patent application Ser. No. 14/046,081, filed Oct. 4, 2013, now U.S. Pat. No. 8,980,219. Each of the above-referenced patent applications is herein incorporated by reference in its entirety.

TECHNICAL FIELD

The present generally relates to a reagent including multiple element types (i.e. metal, metalloid, non-metal), complexed with a hydride molecule, and methods for making the same.

BACKGROUND

The background description provided herein is for the purpose of generally presenting the context of the disclosure. Work of the presently named inventors, to the extent it may be described in this background section, as well as aspects of the description that may not otherwise qualify as prior art at the time of filing, are neither expressly nor impliedly admitted as prior art against the present technology.

Anionic Element Reagent Complexes, or AERCS, complexes of a hydride molecule and an element, are highly useful in the synthesis of nanoparticles. Not only are AERCs relatively easily formed and stable, but through various, simple wet chemistry procedures, they can produce high purity elemental nanoparticles having the element formerly contained in the AERC.

Elemental nanoparticles having a combination of two or more element types (e.g. metal, metalloid, and non-metal), per nanoparticle, can be termed "cross-type elemental nanoparticles." A common, and highly useful, example is silicon carbide nanoparticles. Wet chemistry methods for synthesizing cross-type elemental nanoparticles are in many cases not well developed. To the extent that synthetic methods exist, they often involve high-temperature gas phase reactions, or other challenging and/or expensive steps not easily amenable to scale-up.

In addition, while a large number of different cross-type elemental nanoparticles are theoretically possible, including those having three or more elements of two or more element types per nanoparticle, synthetic methods for producing many of them are largely undeveloped.

Reagents amenable to a robust, scalable wet chemistry synthesis of cross-type elemental nanoparticles of virtually any variation would therefore be desirable.

SUMMARY

Cross-type multi-element reagent complexes and methods for their synthesis are provided.

In one aspect, the present teachings provide a reagent complex having a formula, $Q^0 \cdot X_y$, where $Q^0$ is two or more elements, formally in oxidation state zero; X is a hydride molecule; and y is an integral or fractional value greater than zero. The two or more elements comprise at least two element types (i.e. metals, metalloids, or non-metals). In some variations the hydride molecule can be lithium borohydride.

In another aspect, a method for producing a reagent is provided. The method includes a step of ball-milling a mixture that includes: (i) powders of at least two bulk elements, and (ii) a hydride molecule. The powders of at least two elements comprises a powder of a first element of a first element type and a powder of a second element of a second element type, the first and second element types selected from a group including: metals, metalloids, and non-metals. Performance of the method results in the reagent briefly described above. In different variations, powders of two or more elements can include two, three, or more elements, some or all of which are of different element types, as described above.

BRIEF DESCRIPTION OF THE DRAWINGS

Various aspects and advantages of the disclosure will become apparent and more readily appreciated from the following description of the embodiments taken in conjunction with the accompanying drawings, of which.

DETAILED DESCRIPTION

Figure 1A:
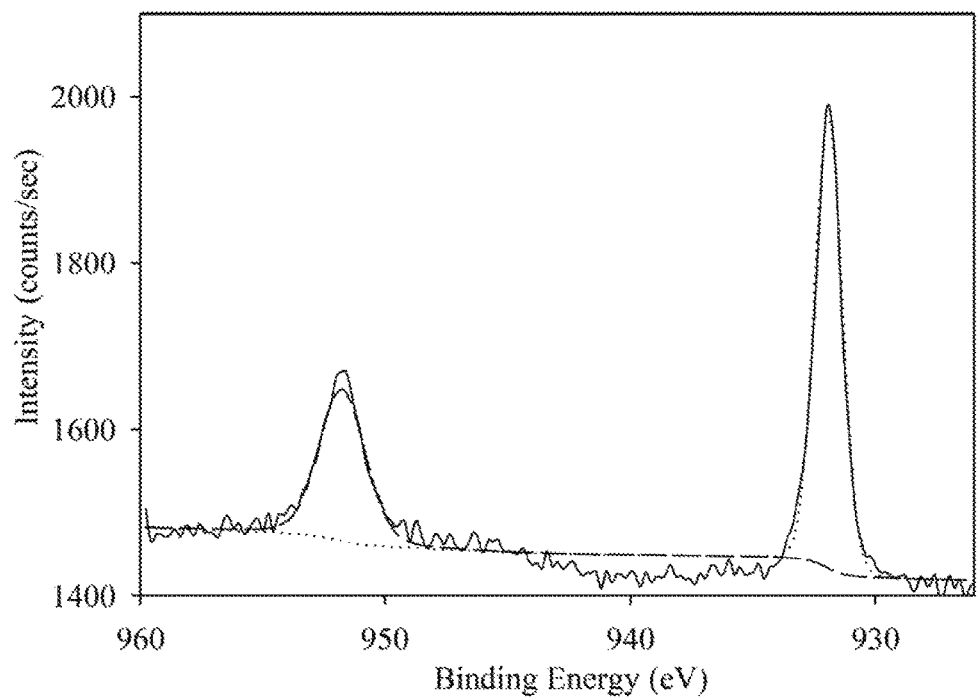
FIG. 1A is a copper-region x-ray photoelectron spectrum (XPS) of a multi-element AERC having a formula CuSe $(LiBH_4)_4$.
Figure 1B:
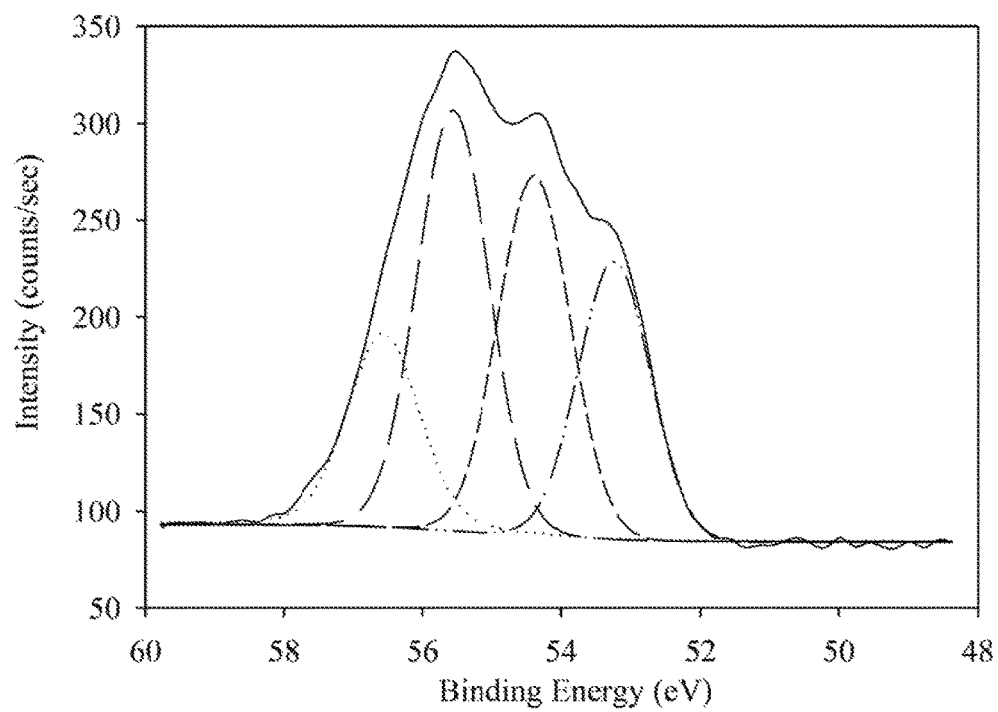
FIG. 1B is a lithium/selenium-region XPS of the AERC of FIG. 1A.
Figure 1C:
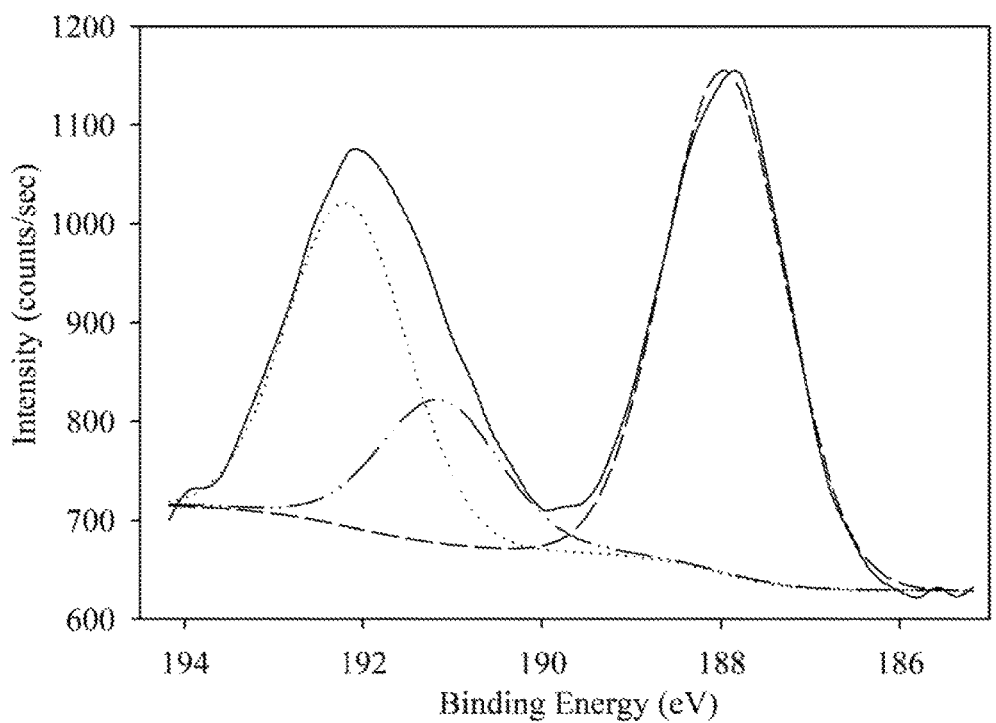
FIG. 1C is a boron-region XPS of the AERC of FIG. 1A.
Figure 2A:
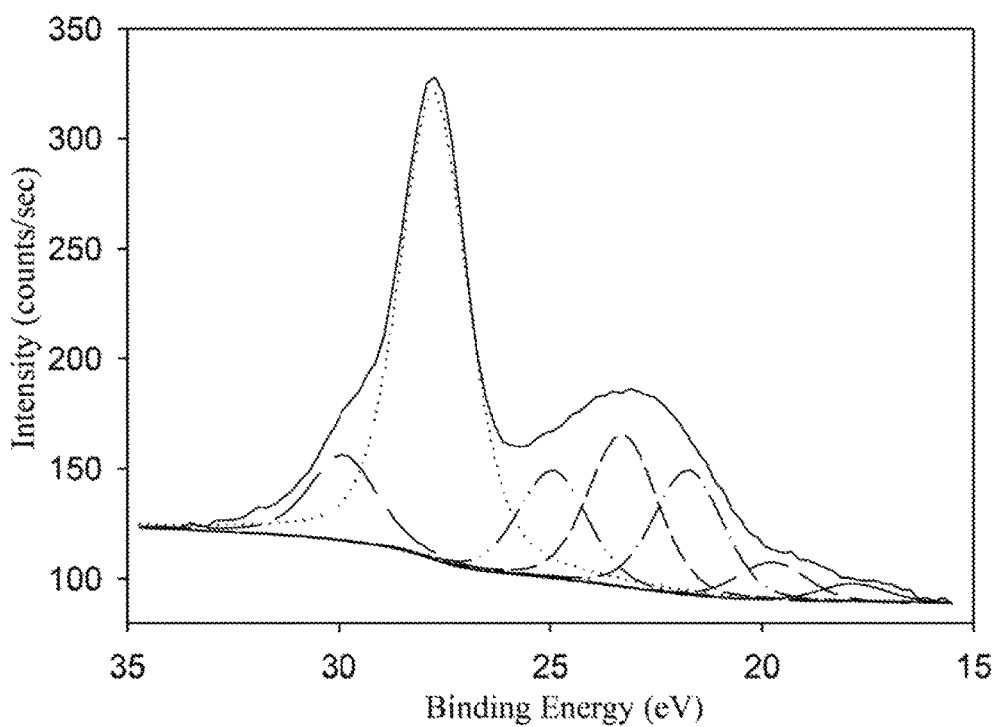
FIG. 2A is a germanium-region XPS of a multi-element AERC having a formula $Ni_{0.4}Ge_{0.6}(LiBH_4)_2$.
Figure 2B:
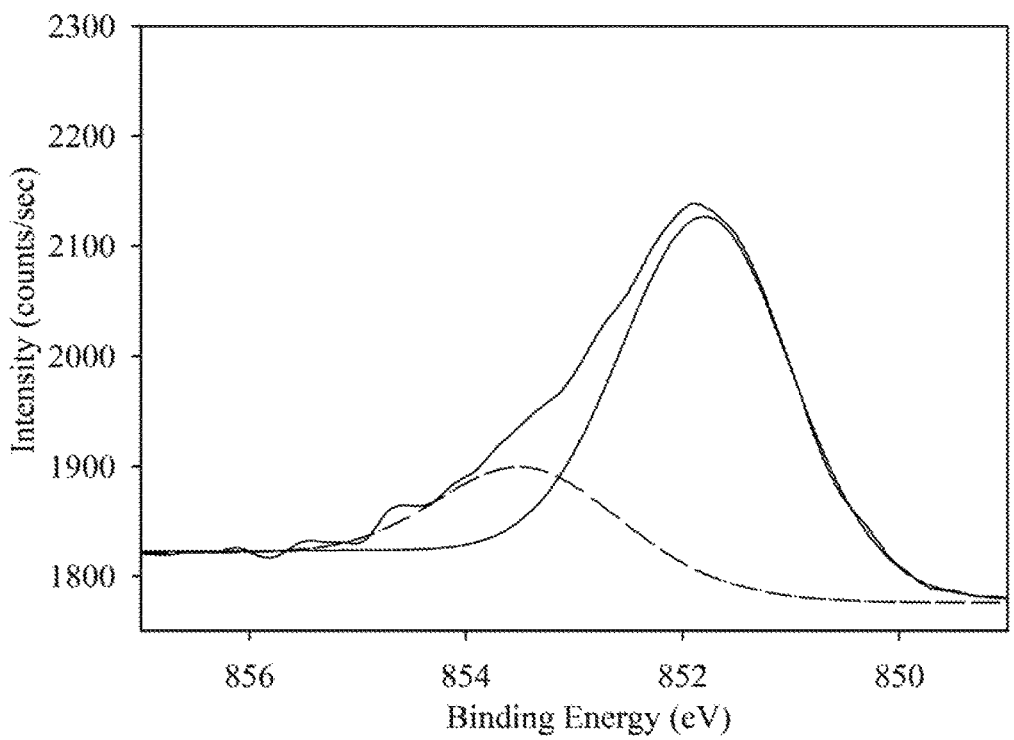
FIG. 2B is a nickel-region XPS of the AERC of FIG. 2A
Figure 2C:
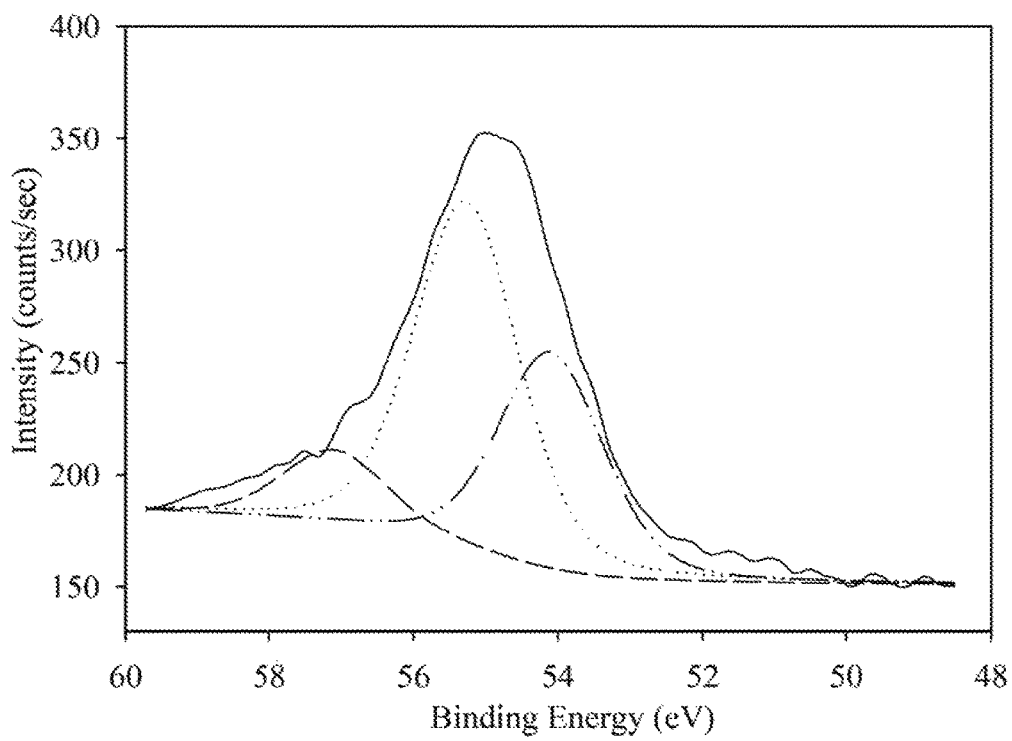
FIG. 2C is a lithium-region XPS of the AERC of FIG. 2A.
Figure 2D:
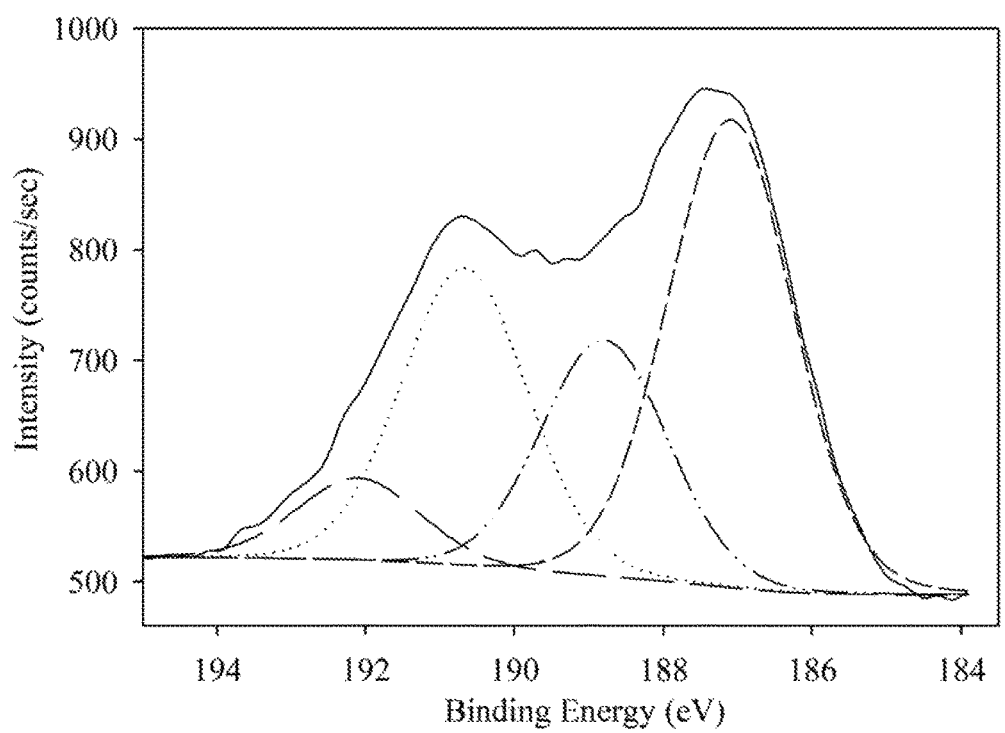
FIG. 2D is a boron-region XPS of the AERC of FIG. 2A.

The present teachings provide Anionic Element Reagent Complexes (AERCs) useful in the synthesis of elemental nanoparticles. The AERCs of the present disclosure include at least two elements, each in elemental form (i.e. formally in oxidation state zero), and at least one hydride molecule complex with the at least two elements. At least two elements in the complex will include at least two element types (metal, metalloid, and/or non-metal). The present teachings also provide methods for forming the disclosed AERCs, the methods generally including a step of ball-milling a mixture that includes: a powder of a first element, a powder of a second element, and a hydride molecule.

The disclosed AERCs are relatively easy to produce, stable under ambient conditions, and easily usable for the synthesis of elemental nanoparticles composed, per nanoparticle, of the at least two elements including the at least two element types (metal, metalloid, and/or non-metal).

Thus, a composition is disclosed, comprising a complex according to Formula I:

$$Q^0 \cdot X_y \quad \text{I,}$$

wherein $Q^0$ is two or more elements, each formally in oxidation state zero, wherein X is a hydride molecule, and wherein y is an integral or fractional value greater than zero. The complex according to Formula I can alternatively be referred to as a "cross-type, multi-element AERC", or for simplicity, simply as an AERC.

The term "element", as used herein, refers generally to elements of Groups 2-16. The description that the element is formally in oxidation state zero indicates, at least, that it is in elemental form, having no formal positive or negative charge. Atoms of the element, formally in oxidation state zero, will alternatively be referred to herein as "elemental atoms". The two or more elements, $Q^0$, according to Formula I can alternatively be referred to as the "elemental component" of an AERC.

The two or more elements, $Q^0$, of Formula I will include elements of at least two element types. As used herein, the phrase "element types", alternatively referred to simply as "types", refers to the group including metals, metalloids, and non-metals. For example, an AERC according to Formula I can include: at least one metal and at least one metalloid; at least one metal and at least one non-metal; at least one metalloid and at least one non-metal; or at least one metal, at least one metalloid, and at least one non-metal.

In this usage, a non-metal refers to any of carbon, phosphorous, sulfur, and selenium; a metalloid refers to any of boron, silicon, germanium, arsenic, antimony, tellurium, and polonium; and a metal refers to any element of Groups 2-15, exclusive of metalloids and non-metals. In some instances, a metal can include a lanthanide.

As used herein, the term "hydride molecule" refers generally to any molecule capable to function as a donor of electron density, or hydrogen anion, or hydride anion. In some instances, a hydride molecule as referenced herein can be a binary metal hydride or "salt hydride" (e.g. NaH, or $MgH_2$), a binary metalloid hydride (e.g. $BH_3$), a complex metal hydride (e.g. $LiAlH_4$), or a complex metalloid hydride (e.g. $LiBH_4$ or $Li(CH_3CH_2)_3BH$). In some examples the hydride will be $LiBH_4$. The term hydride as described above can in some variations include a corresponding deuteride or tritide.

The value y according to Formula I defines the stoichiometry of hydride molecules to elemental atoms in the complex. The value of y can include any integral or fractional value greater than zero. In some instances, y can be less than or equal to 4. In some particular instances, y can equal 3.

Because $Q^0$ refers to two or more elements, the genus described by Formula I intrinsically includes sub-genera, as described in part by Formulae II-IV:

$$R^0 R^{0\prime} \cdot X_\psi \quad \text{II,}$$

$$R^0 R^{0\prime} R^{0\prime\prime} \cdot X_\psi \quad \text{III,}$$

$$R^0 R^{0\prime} R^{0\prime\prime} R^{0\prime\prime\prime} \cdot X_\psi \quad \text{IV, etc.,}$$

wherein $R^0$ is a first element, formally in oxidation state zero and of a first identity; $R^{0\prime}$ is a second element, formally in oxidation state zero and of a second identity; $R^{0\prime\prime}$ is a third element, formally in oxidation state zero and of a third identity; $R^{0\prime\prime\prime}$ is a fourth element, formally in oxidation state zero and of a forth identity; and wherein $\Psi$ is an integral or fractional value greater than zero. As suggested by the abbreviated term "et cetera" above, it will be noted that an AERC of the present disclosure is not limited to inclusion of two to four elements, but can include more than four elements. It will be understood that the value $\Psi$ according to Formulae II-IV defines the stoichiometry of hydride molecules to elemental atoms, of each of the elements (e.g. $R^0$, $R^{0\prime}$, $R^{0\prime\prime}$, $R^{0\prime\prime\prime}$) individually, in the complex.

Thus, if an AERC according to Formula II has a metal as $R^0$, $R^{0\prime}$ could be either a metalloid or a non-metal. Similarly, for an AERC according to Formula III, $R^0$ could be a metal, $R^{0\prime}$ a metalloid, and $R^{0\prime\prime}$ a non-metal. While, for clarity, subscripts representing the stoichiometry of multiple elements such as $R^0$, $R^{0\prime}$, $R^{0\prime\prime}$, and $R^{0\prime\prime\prime}$ are omitted, it is to be understood that in all variations, any or all of the at least two elements can be present in the AERC at stoichiometries the same as, or different from, one another. In instances of reagents according to any of Formulae II-IV in which two or more of the elements are present in non-equivalent stoichiometric proportion relative to one another, quantitative subscripts can be applied to the elements as needed.

Examples of such cross-type, multi-element AERCs are shown in FIGS. 1-4. In all of FIGS. 1-4, the solid line, generally having the highest intensity values, represents acquired data, while the various dashed and dotted lines, generally having lower intensity values and each having a single Gaussian peak, show computationally deconvoluted component peaks. FIGS. 1A-C show x-ray photoelectron spectra (XPS) in the copper, lithium/selenium, and boron regions, respectively, for an AERC having the formula $CuSe(LiBH_4)_4$ (i.e. metal/non-metal AERC). AERC formation is coincident with an anionic shift in the spectrum of the elemental component of the AERC, observable by the shift of pre-existing bands or appearance of new bands at lower binding energy. In the case of the $CuSe(LiBH_4)_4$ the 2p3/2 peak, centered at 932.4 eV in bulk copper, is shifted in the AERC to 931.9 eV. Similarly, the 55.3 eV peak normally present in bulk selenium is shifted to 53.2 eV in the AERC.

FIGS. 2A-D show XPS in the germanium, nickel, lithium, and boron regions, respectively, for an AERC having the formula $Ni_{0.4}Ge_{0.6}(LiBH_4)_2$ (i.e. a metal/metalloid AERC). The nickel 2p3/2 peak, normally present at 852.3 eV in the bulk metal, is shifted by 0.5 eV to 851.8 eV. The Ge 3d peak, normally present at 28.95 in the bulk metalloid, is dramatically shifted to a range of binding energies including 27.7 to 17.8 eV.

Figure 3A:
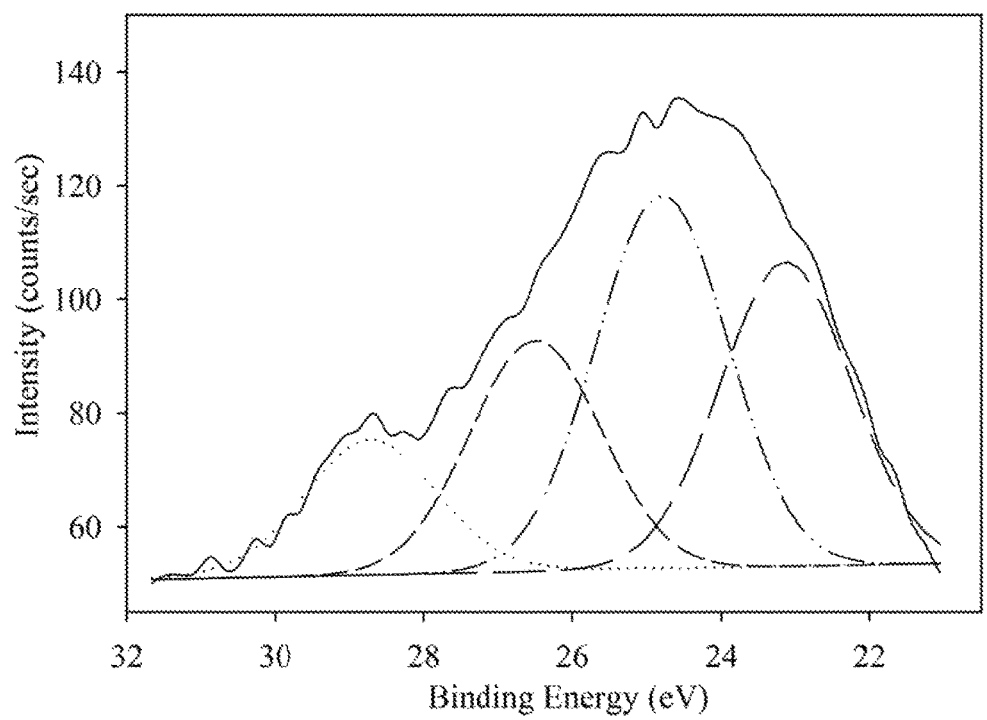
FIG. 3A is a germanium-region XPS of a multi-element AERC having a formula $SeGe(LiBH_4)_4$.
Figure 3B:
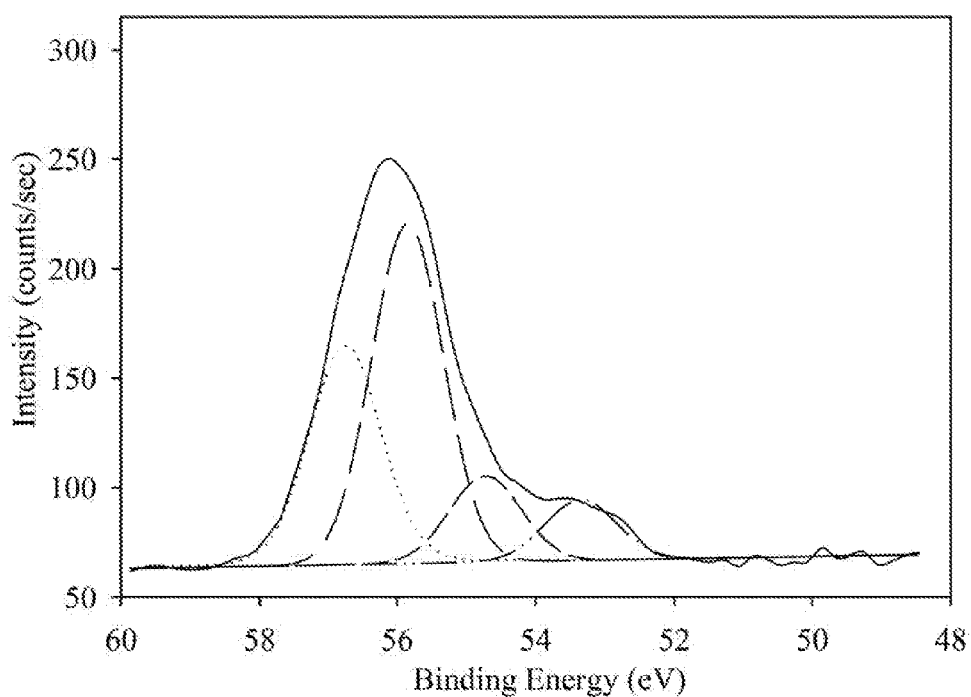
FIG. 3B is a lithium/selenium-region XPS of the AERC of FIG. 3A.
Figure 3C:
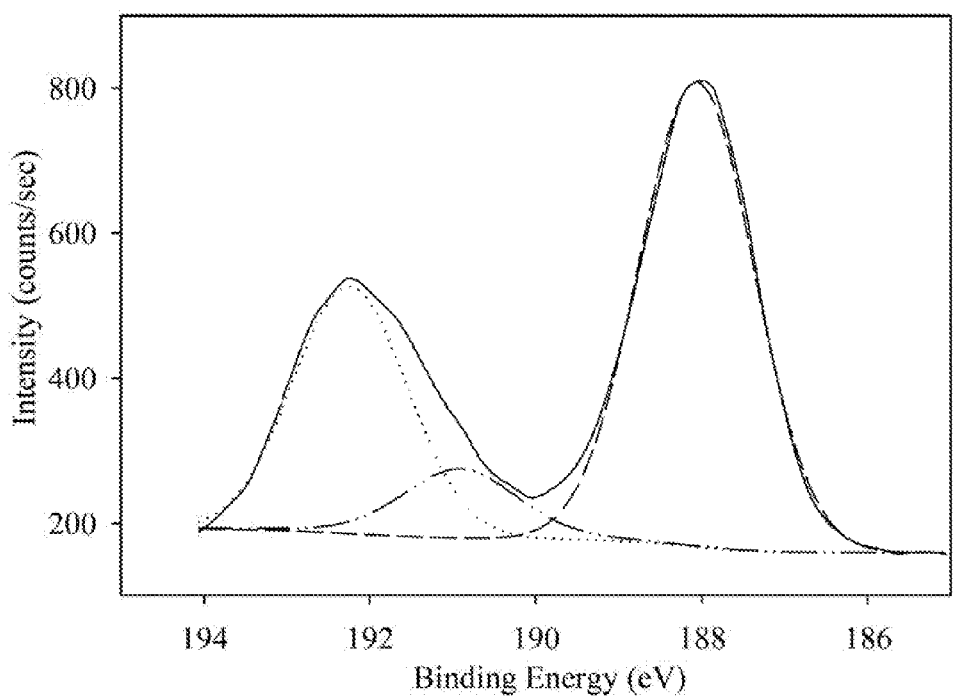
FIG. 3C is a boron-region XPS of the AERC of FIG. 3A.

FIGS. 3A-C show XPS in the germanium, lithium/selenium, and boron regions, respectively, for an AERC of formula $SeGe(LiBH_4)_4$ (i.e. a metalloid/non-metal AERC). The metalloid Ge 3d binding energy (28.95 eV) has been anionically shifted to a range of binding energies from 28.7 to 23.1 eV. The non-metal Se 3d binding energy has been shifted down from 55.3 eV to 53.4 eV through complexation into the metalloid/non-metal $SeGe(LiBH_4)_4$ AERC.

Figure 4A:
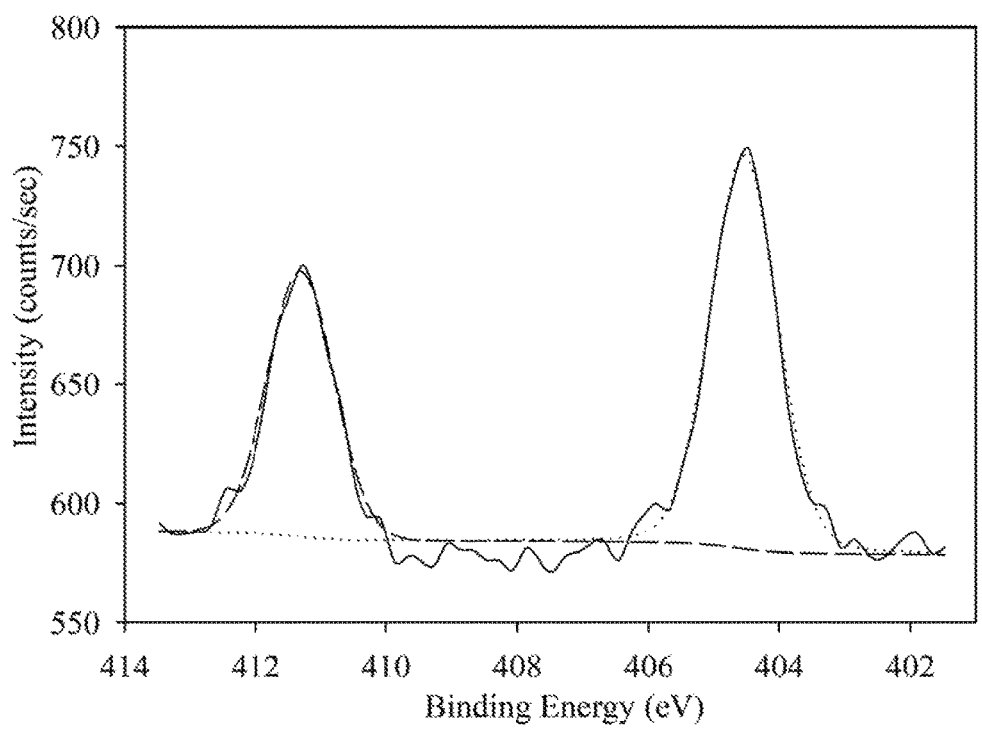
FIG. 4A is a cadmium-region XPS of a multi-element AERC having a formula $Cd_{0.45}Se_{0.45}B_{0.1}(LiBH_4)_2$.
Figure 4B:
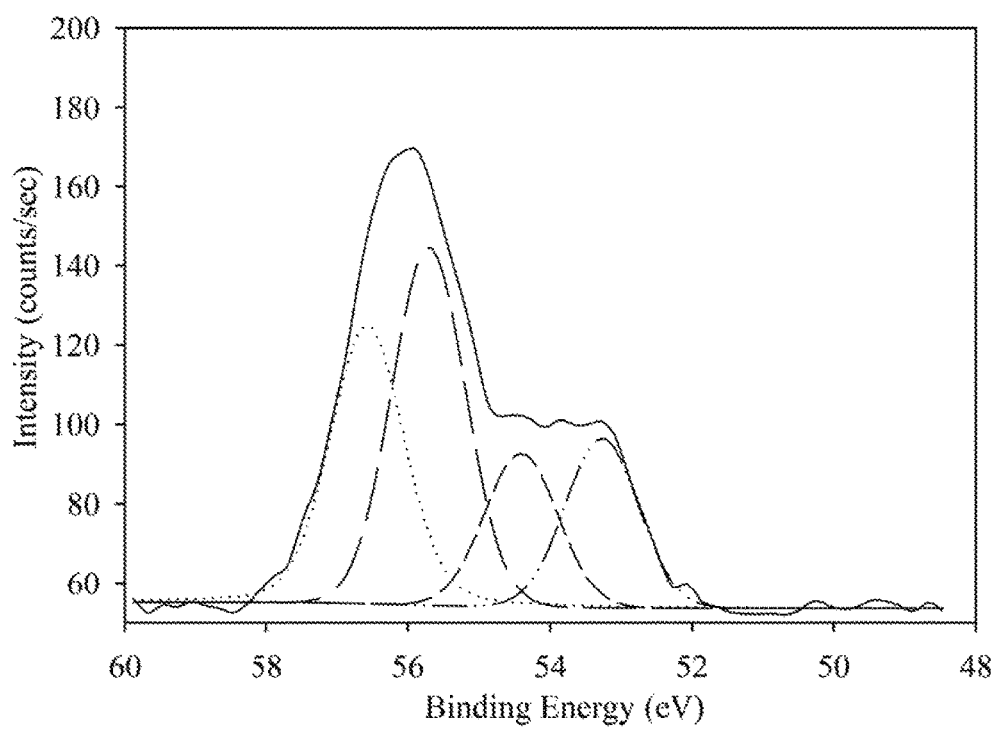
FIG. 4B is a lithium/selenium-region XPS of the AERC of FIG. 4A.
Figure 4C:
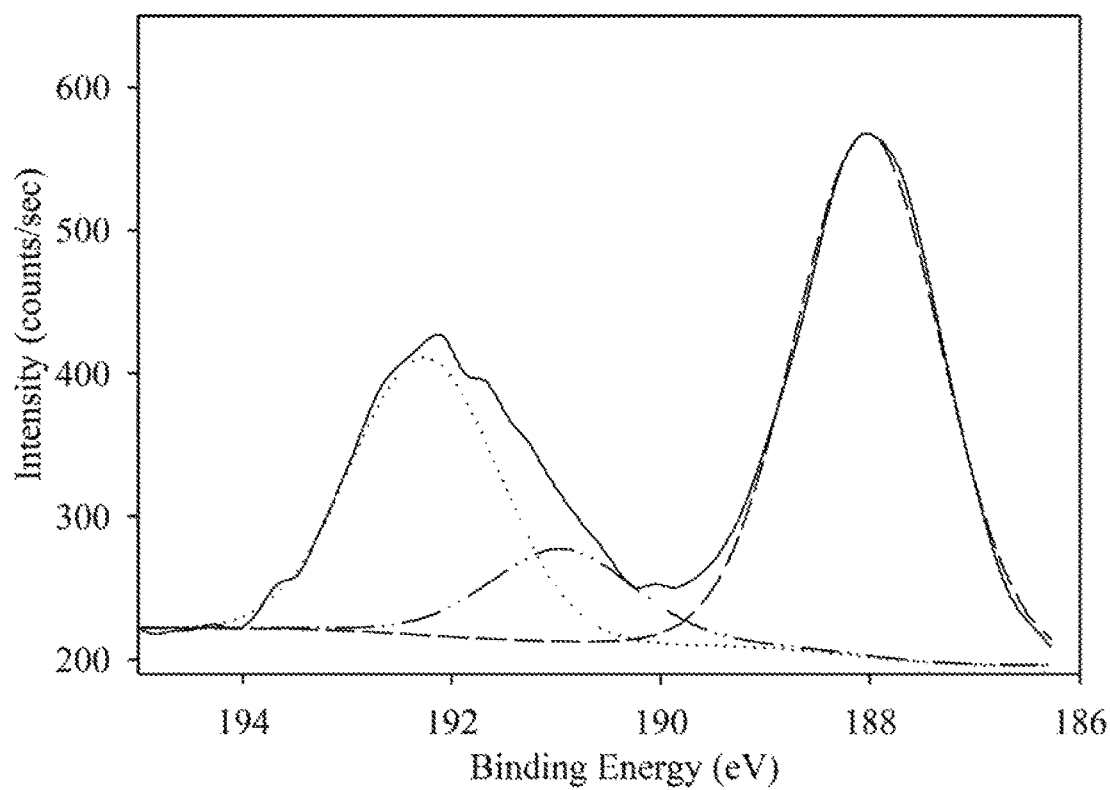
FIG. 4C is a boron-region XPS of the AERC of FIG. 4A.

FIGS. 4A-4C show XPS in the cadmium, lithium/selenium, and boron regions, respectively, for an AERC of formula $Cd_{0.45}Se_{0.45}B_{0.1}(LiBH_4)_2$ (i.e. a three-element, metal/metalloid/non-metal AERC). The Cd metal component of the AERC expresses an anionic shift down 0.3 eV in binding energy to 404.5 eV. The examination of 1s electron binding energy of the elemental boron component of the AERC is made difficult by the abundance of boron from $LiBH_4$ in the complex, largely obscuring the elemental boron. However, comparison to the boron-region XPS of $SeGe(LiBH_4)_4$ reveals that the elemental boron component of $Cd_{0.45}Se_{0.45}B_{0.1}(LiBH_4)_2$ experiences an expansion between the two lowest binding energy peaks of 0.2 eV. This supports the assertion of a complicated boron electron binding energy shift of 0.1 eV to lower energy. The non-metal selenium 3d XPS data again shows anionically shifted peaks (versus the bulk selenium 3d reference value of 55.3 eV) of 54.4 and 53.3 eV.

Thus, all of the formally oxidation state zero elements, when incorporated into multi-element AERCs, experience an anionic shift in one or more electron orbitals as measured by XPS. Observation of this phenomenon can be a useful approach for monitoring successful AERC formation. Without being bound to any particular theory, it is believed that complexation with and close proximity of the at least two element components in the AERC to the relatively electron-rich hydride molecule may cause the elements to obtain a "super reduced" or pseudo anionic character, despite the fact that many such elements are normally not reducible below oxidation state zero. It is further believed that such electronic effects may play a role in the ease with which the two or more elements of the AERC can be caused to form into nanoparticles.

Single-element nanoparticles can be readily synthesized from single-element AERCs, for example by addition of a solvent and/or a ligand/surfactant to the AERC. Thus, it will be readily understood that the cross-type, multi-element AERCs of the present disclosure can be similarly employed to produce nanoparticles consisting of multiple elements, including combinations such as metal/non-metal, metalloid/non-metal, and so forth.

Additionally disclosed is a method for producing a cross-type, multi-element Anionic Element Reagent Complex. The method includes a step of providing mechanicochemical stimulation to a mixture that includes: (i) powders of at least two elements, and (ii) a bulk preparation of a hydride molecule. In many instances, the provision of mechanico-chemical stimulation will be achieved by ball-milling the aforementioned mixture. This step will then produce a complex according to Formula I, above, including any of Formulae II-IV, as described.

The terms "element" and "hydride molecule" as used in reference to the method are as defined above. The terms "powder", as in "powders of" and the phrase "bulk preparation", are largely interchangeable, and typically refer to a powder or particulate form, but may also refer generally to any other bulk forms of the material in question that are readily reducible to powder, for example by ball-milling. An example of such another bulk form can be a compacted granular form. It will be appreciated that the powders of at least two elements and/or the bulk preparation of a hydride molecule will not necessarily be 100% pure, but should generally consist predominantly of the at least two elements or the hydride molecule, respectively.

The powders of at least two elements will include a powder of a first element of a first element type (metal, metalloid, or non-metal, as described above), and a powder of a second element of a second element type, wherein the second type is different from the first type. In some instances, the powders of at least two elements will include a powder of a first element of a first element type, a powder of a second element type, and a powder of a third element. In some such cases, the third element will be of the first or second element types (i.e. two of the elemental powders will be of the same type, and one will be of a different type). In other such cases, the third element will be of a third element type (i.e. the powder of at least two elements will include powders of three elements: a metal, a metalloid, and a non-metal).

In some instances, the ball-milling step can be performed in an oxygen-free environment, in an anhydrous environment, or in an environment that is oxygen-free and anhydrous, such as under argon or under vacuum. An oxygen-free and/or anhydrous environment can potentially limit undesired oxidation of the resulting ligated reagent complex.

The ball-milling step of the present method will generally produce a complex according to Formula I, as described above. The two or more elements, $Q^0$, of Formula I, will generally correspond to the at least two elements as present in the powders of at least two elements. The mixture that is ball-milled in the ball-milling step can include any non-zero molar ratio of hydride molecules contained in the bulk hydride molecule to elemental atoms contained in the powders of at least two elements. It will be understood that the value y in Formula I for the complex produced by the ball-milling step will generally reflect this molar ratio. For example, if the mixture to be ball-milled includes two equivalents of hydride molecule and one equivalent of elemental atoms, then the value y, according to Formula I, for the resulting complex will be two.

It will further be understood that the ball-milling step can produce a complex according to any of Formulae II-IV, as described above. The mixture that is ball-milled in the ball-milling step can include any non-zero molar ratio of hydride molecules contained in the bulk hydride molecule to elemental atoms contained in the powders of at least two elements. The powders of first element, second element, third element, etc. can be present in any molar ratios relative to one another, and when any such molar ratios are not equal to one, the Formula(e) will incorporate stoichiometric subscripts for the individual elements (e.g. $R^0$, $R^{0'}$, $R^{0''}$, $R^{0'''}$), as referenced above. The mixture can also include any molar ratio of hydride molecule, present in the bulk preparation of a hydride molecule, to atoms of the elements of the various types, present in the powders of the elements of various types. This molar ratio will generally be reflected in the value of $\Psi$ in Formulae II-IV.

The present disclosure is further illustrated with respect to the following examples. It needs to be understood that these examples are provided to illustrate specific embodiments of the present disclosure and should not be construed as limiting the scope of the present disclosure.

EXAMPLES 1-4

Formation of Multi-Element AERCs

One part copper powder and one part selenium powder is mixed with four parts LiBH$_4$, to produce mixture 1, for Example 1. Separately, 0.4 parts nickel powder and 0.6 parts germanium powder is mixed with two parts LiBH$_4$, to produce mixture 2, for Example 2. Separately, 1 part selenium powder and 1 part germanium powder is mixed with four parts LiBH$_4$, to produce mixture 3, for Example 3. Separately, 0.45 parts cadmium powder, 0.45 parts selenium powder, and 0.1 parts boron powder is mixed with two parts LiBH$_4$, to produce mixture 4, for Example 4. Each of mixtures 1-4 is independently ball-milled under conditions similar to the following: each mixture is added to a stainless steel ball mill jar under argon, with steel balls. The AERC is then formed mechanochemically by milling in a planetary ball mill, at 150 to 400 rpms (depending on hardness of metal, metalloid and/or non-metal element powder), for 4 hours. The four ball-milling steps produce the AERCs: CuSe(LiBH$_4$)$_4$, (Ni$_{0.4}$Ge$_{0.6}$(LiBH$_4$)$_2$, SeGe(LiBH$_4$)$_4$, and $Cd_{0.45}Se_{0.45}B_{0.1}(LiBH_4)_2$, respectively. FIGS. 1A-4C illustrate XPS data for Examples 1-4, as described above.

The foregoing description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure; various steps may be performed independently or at the same time unless otherwise noted. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment is included in at least one embodiment or aspect. The appearances of the phrase "in one aspect" (or variations thereof) are not necessarily referring to the same aspect or embodiment.

While particular embodiments have been described, alternatives, modifications, variations, improvements, and substantial equivalents that are or may be presently unforeseen may arise to applicants or others skilled in the art. Accordingly, the appended claims as filed and as they may be amended, are intended to embrace all such alternatives, modifications variations, improvements, and substantial equivalents.

What is claimed is:

1. A reagent comprising a complex having a formula:

$$Q^0 \cdot X_y$$

wherein $Q^0$ comprises two or more elements, formally in oxidation state zero, wherein X is a hydride molecule, and wherein y is an integral or fractional value greater than zero; and wherein the two or more elements comprise at least two different element types selected from a group including: metals, metalloids, and non-metals.

2. The reagent as recited in claim 1, wherein the complex has a formula:

$$R^0 R^{0\prime} \cdot X_\psi$$

wherein $R^0$ is a first element of a first element type, $R^{0\prime}$ is a second element of a second element type, and $\Psi$ is an integral or fractional value greater than zero, the first and second element types selected from the group including: metals, metalloids, and non-metals.

3. The reagent as recited in claim 2, wherein $R^0$ is copper and $R^{0\prime}$ is selenium.

4. The reagent as recited in claim 2, wherein $R^0$ is nickel and $R^{0\prime}$ is germanium.

5. The reagent as recited in claim 2, wherein $R^0$ is selenium and $R^{0\prime}$ is germanium.

6. The reagent as recited in claim 2, wherein X is lithium borohydride.

7. The reagent as recited in claim 1, wherein the complex has a formula:

$$R^0 R^{0\prime} R^{0\prime\prime} \cdot X_\psi$$

wherein $R^0$ is a first element of a first element type, $R^{0\prime}$ is a second element of the first element type, $R^{0\prime\prime}$ is a third element of a second element type, and $\Psi$ is an integral or fractional value greater than zero, the first and second element types selected from the group including: metals, metalloids, and non-metals.

8. The reagent as recited in claim 1, wherein the complex has a formula:

$$R^0 R^{0\prime} R^{0\prime\prime} \cdot X_\psi$$

wherein $R^0$ is an element of a first element of a first element type; $R^{0\prime}$ is a second element of a second element type; $R^{0\prime\prime}$ is a third element of a third element type; and $\Psi$ is an integral or fractional value greater than zero; the first, second, and third element types selected from the group including: metals, metalloids, and non-metals.

9. The reagent as recited in claim 8, wherein $R^0$ is cadmium, $R^{0\prime}$ is selenium, and $R^{0\prime\prime}$ is boron.

10. The reagent as recited in claim 1, wherein the hydride molecule, X, comprises lithium borohydride.

11. A method for synthesizing a reagent, the method comprising:
   ball-milling a mixture that includes:
      powders of at least two elements comprising:
         a powder of a first element of a first element type; and
         a powder of a second element of a second element type; and
      a bulk preparation of a hydride molecule,
   wherein the first and second element types are selected from a group including: metals, metalloids, and non-metals; and
   wherein the ball-milling produces a complex having a formula:

$$Q^0 \cdot X_y$$

wherein $Q^0$ is the at least two elements, formally in oxidation state zero, X is the hydride molecule, and y is an integral or fractional value greater than zero.

12. The method as recited in claim 11, wherein the first element is nickel and the second element is germanium.

13. The method as recited in claim 11, wherein the first element is copper and the second element is selenium.

14. The method as recited in claim 11, wherein the first element is selenium and the second element is germanium.

15. The method as recited in claim 11, wherein the powders of at least two elements comprises a powder of a third element of the second element type.

16. The method as recited in claim 11, wherein the powders of at least two elements comprises a powder of a third element of a third element type selected from the group including: metals, metalloids, and non-metals.

17. The method as recited in claim 16, wherein the first, second, and third elements are cadmium, selenium, and boron.

* * * * *